3,032,928
Patented May 8, 1962

3,032,928
SELF-SEALING SHINGLE ADHESIVE
James W. Jackson, Jr., East Walpole, Mass., assignor to Bird & Son, inc., East Walpole, Mass., a corporation of Massachusetts
No Drawing. Filed Oct. 22, 1957, Ser. No. 691,527
6 Claims. (Cl. 50—243)

This invention relates to self-sealing shingles (see, e.g., Kirschbraun U.S. Patent No. 2,210,209), and more particularly to new adhesives for use thereon.

To function satisfactorily in producing the sealing down of shingle tabs automatically (responsive to weather conditions and following laying of the shingles by nailing them down in the manner long familiar to the art) an adhesive composition must fill a number of important requirements. The composition must be activated by heat from the sun's rays at a sufficiently low temperature to insure the occurrence of tab sealing down within a short period after the shingles are laid down. The adhesive should have a sharp melting point, to that sealing takes place very shortly once the melting point of the adhesive is reached, and also so that the shingle tabs are held especially securely after temperature again drops below the melting point, to produce an immediate and sharp setting of the adhesive into solid state. At the same time, the adhesive should remain tacky at temperatures as much as 30° F. above the softening point, so that substantial sealing-down of tabs is retained even at temperatures in that range above adhesive melting point. Furthermore, the adhesive should have very low flow characteristics at temperatures up to 176° F. on a steep-pitch roof, or migration of adhesive might take place, to impoverish the seal areas.

All the requirements above listed must be met in order to achieve the proper functioning of the adhesive composition after the shingles are nailed down. But in order to successfully package self-sealing shingles in packages of conventional type, the adhesive must meet still further requirements. It must not be tacky, at temperatures as high as 110° F., or undue sticking in the bundle may result. Also, cold flow must be of a very low order, at pressures as high as 2.5 to 6 p.s.i.; otherwise bands or spots of the adhesive are likely to be flattened by the weight and pressure of other shingles in the bundles. The latter is especially important if the band or spots are applied on the top face of thick-butt shingles just above the butt portions thereof, as in the copending patent application of Stanley H. Sallie, Serial No. 691,676, entitled "Self-Sealing Shingle." In such an application the adhesive spots or band should, to effect optimum sealing, preferably be of thickness greater than the additional thickness of the butt portion of the shingles, so that an overlying shingle tab will not bridge the adhesive to an underlying butt portion, and thus fail to contact the adhesive spots or band and be sealed down thereby.

I have found that an adhesive composition meeting all the above requirements results if petroleum asphaltic materials are mixed with a high melting point crystalline petroleum wax, such as a paraffin wax. Such wax may suitably have a melting point in the range of 153° to 159° F. and a penetration (ASTM Test No. D 5–52) of from 8 to 12 at 77° F., from 15 to 25 at 110° F., and from 40 to 50 at 130° F.

Such mixtures are characterized by not only the requirements above set forth, but also by strikingly low cold flow and by a surprising freedom from tackiness at low temperatures coupled with satisfactory tackiness at higher temperatures. Apparently, some of the petroleum wax migrates to the surface of the adhesive composition to diminish its tackiness at lower temperatures (and consequent tendency to cause sticking of the bundled shingles). In my most preferred embodiments of the invention I add from 0.5 to 5% natural or synthetic rubber, to provide all the advantages above set forth as well as still better tack, especially at higher temperatures.

As examples of suitable adhesives according to the present invention, the following are set forth, proportions being by weight:

*Example 1*

147° cracking coil tar (Enjay) _____ 89
High melting point paraffin wax (Sunoco #5512) ____ 11

The above paraffin wax has the following specifications:

Melting point (AMP), ° F_____ 153–159
Penetration (ASTM D 5–52):
   77° F_____ 8–12
   110° F_____ 15–25
   130° F_____ 40–50
Viscosity, Saybolt Universal (ASTM 446–53)
   (max.)_____ 45.0
Flash point (COC) (min.)_____ 465

*Example 2*

147° cracking coil tar (Socony Mobil CC–140) _____ 81
155° paraffin wax (Sunoco #5512)_____ 10
Rubber-barytes coprecipitate_____ 9

The cracking coil tar used in this example (and obtained as a by-product in the high-temperature pressure cracking of petroleum to produce gasoline) has the following characteristics:

Melting point (Ring and Ball), ° F_____ 144–150
Penetration (ASTM 5–52):
   At 77° F_____ 7–10
   At 32° F_____ 4–6
   At 115° F_____ Not more than 90
Flash point (COC) (min.), ° F_____ 550
Fire point (COC) (min.), ° F_____ 640
Oliensis spot_____ Positive
Viscosity at 400° F. (Engler, max.)_____ 4.0°

The rubber-barytes coprecipitate is of the type disclosed in Endres et al. U.S. Patent No. 2,700,655, and is characterized by 75% barytes and 25% rubber. A suitable rubber going into this product is a GR–S type (GR–S 2006) which may be described as a low solids, small particle size, butadiene-styrene copolymer latex manufactured by hot emulsion polymerization and having the following properties:

Total solids_____percent__ 27
Monomer charge ratio Bd./Sty_____ 70/30
Bound styrene_____percent__ 23
Conversion _____do____ 72

*Example 3*

178° blend of straight run steam- and vacuum-reduced
   asphalt and solvent precipitated bitumen_____ 89
High-melting point petroleum wax_____ 11

The 178° asphalt-bitumen blend used in this example had the following specifications:

Melting point, ° F_____ 175–180
Penetration:
   77° F_____ 8–12
   32° F_____ 3–5
   115° F_____ 35 (max.)
Flash point, ° F_____ 575
Oliensis spot_____ Negative
Ductility (77° F.) _____ 3 cms. plus All three examples above set forth provided self-sealing adhesives satisfactory for use on shingles and meeting all the requirements above specified. Melting point was sharp, and the adhesive remained tacky to temperatures 30° above the melting point. Examples 2 and 3 retained also extremely high cohesiveness (or internal strength) to temperatures 30° above their melting point. Flow on steep pitch roofs was low at temperatures up to 176° F. Tack was very low at temperatures under 110° F. Cold flow was low, at pressures as high as 6 p.s.i.

The high-melting point petroleum wax may be used in amount in the range 5%–20% by weight of the adhesive, whether or not rubber is used therein.

Rubber is added in the preferred embodiments, in amounts ranging from 0.5% to 5.0% of the adhesive by weight. Natural or other than GR–S synthetic rubber may be used, and addition need not be as a coprecipitate with barytes or other inert, through addition in that manner greatly facilitates mixing, and eliminates necessity for milling.

Although inclusion of the wax ingredient decreases tendency to stick in the bundle, it is preferred to provide further insurance against sticking by applying to the lower faces of the shingles a band of antistick or abhesive material, against which the spots or bands of adhesive may rest while in the bundle. One material which may suitably be used for depositing this antistick coating is Differentiated Latex Lube, Type GR, shipped by Du Bois Co. with 67% solids content. This material may be mixed with four times its amount by weight of water, and deposited in a band on the lower face of each shingle to form the above-referred to antistick strip. (Latex Lube is a mixed medium titer soap of relatively highly saturated fatty acids, the saponifying agents being sodium and potassium in approximately eutectic ratio.) Another suitable solution for deposit on the shingles to form an antistick band has the following composition:

| | Percent |
|---|---|
| Dow 22 silicone | 2.5 |
| Acetic acid, glacial | 0.5 |
| Dow XEY 21 catalyst | 0.5 |
| Water | 96.5 |

I claim:

1. A seal-down shingle having adherent thereto at least one deposit of an adhesive composition for automatically sealing down tabs thereof responsive to natural heat, said composition comprising a mixture including:

| | Percent |
|---|---|
| Petroleum asphalt | 75–95 |
| High melting point (at least 153° F.) petroleum wax | 5–20 |

2. The shingle of claim 1 in which said petroleum asphalt is a cracking coil tar having a melting point of 144° F. to 150° F. and a penetration of, at:

77° F., 7 to 10;
32° F., 4 to 6; and
115° F., not more than 90.

3. The shingle of claim 1 in which said wax is a paraffin wax.

4. The shingle of claim 3 in which said wax has the following specifications:

| | |
|---|---|
| Melting point (AMP), ° F | 153–159 |
| Penetration (ASTM D 5-52): | |
| 77° F | 8–12 |
| 110° F | 15–25 |
| 130° F | 40–50 |
| Viscosity, Saybolt Universal (ASTM 446-53) (max.) | 45.0 |

5. A seal-down shingle having adherent thereto at least one deposit of an adhesive composition for automatically sealing down tabs thereof responsive to natural heat, said composition comprising a mixture of:

| | Percent |
|---|---|
| 147° F. cracking coil tar | 89 |
| High melting point (at least 153° F.) paraffin wax | 11 |

6. A seal-down shingle having adherent thereto at least one deposit of an adhesive composition for automatically sealing down tabs thereof responsive to natural heat, said composition comprising a mixture of:

| | Percent |
|---|---|
| 178° F. blend of straight run steam- and vacuum-reduced asphalt and solvent-precipitated bitumen | 89 |
| High melting point (at least 153° F.) petroleum wax | 11 |

References Cited in the file of this patent

UNITED STATES PATENTS

| | | |
|---|---|---|
| 2,210,209 | Kirschbraun | Aug. 6, 1940 |
| 2,464,759 | Camp | Mar. 15, 1949 |
| 2,779,745 | Howland | Jan. 29, 1957 |
| 2,809,179 | Endres et al. | Oct. 8, 1957 |
| 2,848,429 | Woodruff et al. | Aug. 19, 1958 |
| 2,863,405 | Leibrook et al. | Dec. 9, 1958 |

UNITED STATES PATENT OFFICE
CERTIFICATE OF CORRECTION

Patent No. 3,032,928

May 8, 1962

James W. Jackson, Jr.

It is hereby certified that error appears in the above numbered patent requiring correction and that the said Letters Patent should read as corrected below.

Column 1, line 21, for "to" read -- so --; column 3, line 14, for "through" read -- though --.

Signed and sealed this 25th day of September 1962.

(SEAL)
Attest:

ERNEST W. SWIDER
Attesting Officer

DAVID L. LADD
Commissioner of Patents